United States Patent
Heo (10) Patent No.: US 10,760,923 B2
(45) Date of Patent: Sep. 1, 2020

(54) AUTOMATIC CONTROL METHOD FOR CARPOOL LANE FOR NAVIGATION TERMINAL

(71) Applicants: Hyundai Motor Company, Seoul (KR); Kia Motors Corporation, Seoul (KR)

(72) Inventor: Sung Wook Heo, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 167 days.

(21) Appl. No.: 15/791,136

(22) Filed: Oct. 23, 2017

(65) Prior Publication Data

US 2018/0266844 A1 Sep. 20, 2018

(30) Foreign Application Priority Data

Mar. 17, 2017 (KR) .................. 10-2017-0033703

(51) Int. Cl.
*G01C 21/36* (2006.01)
*G01C 21/34* (2006.01)

(52) U.S. Cl.
CPC ..... *G01C 21/3658* (2013.01); *G01C 21/3438* (2013.01); *G01C 21/3461* (2013.01); *G01C 21/3605* (2013.01)

(58) Field of Classification Search
CPC ............ G01C 21/3658; G01C 21/3438; G01C 21/3461; G01C 21/3605
USPC ........................................................... 701/418
See application file for complete search history.

(56) References Cited

U.S. PATENT DOCUMENTS

| | | | |
|---|---|---|---|
| 6,295,503 B1* | 9/2001 | Inoue | G01C 21/3461 340/905 |
| 8,340,890 B1 | 12/2012 | Cobbold | |
| 8,983,770 B2* | 3/2015 | Machino | G01C 21/3415 701/409 |
| 2006/0253249 A1* | 11/2006 | Bruelle-Drews | G01C 21/3453 701/533 |
| 2007/0050134 A1* | 3/2007 | Hayashida | G01C 21/3602 701/414 |
| 2008/0288163 A1* | 11/2008 | Asano | G01C 21/3658 701/118 |
| 2010/0076676 A1* | 3/2010 | Machino | G01C 21/3461 701/413 |
| 2010/0169007 A1* | 7/2010 | Kaushik | G01C 21/26 701/532 |

(Continued)

FOREIGN PATENT DOCUMENTS

| | | |
|---|---|---|
| CN | 102156941 A | 8/2011 |
| JP | 2004-234370 A | 8/2004 |

(Continued)

*Primary Examiner* — Tuan C To
(74) *Attorney, Agent, or Firm* — Morgan, Lewis & Bockius LLP (57) ABSTRACT

An automatic control method for a carpool lane for a navigation terminal, may include setting a destination for the navigation terminal, checking a carpool lane along a route corresponding to the set destination, determining conditions for using the carpool lane, displaying settings for a carpool mode option on the navigation terminal when a vehicle being driven is allowed to use the carpool lane, and guiding the vehicle to the carpool lane when the carpool mode option is set.

18 Claims, 7 Drawing Sheets

(56) References Cited

U.S. PATENT DOCUMENTS

| | | | |
|---|---|---|---|
| 2011/0155803 A1* | 6/2011 | Nieuwland | B60R 16/037 235/380 |
| 2015/0142303 A1* | 5/2015 | Nishibashi | G01C 21/3655 701/428 |
| 2015/0324653 A1* | 11/2015 | Xu | G08G 1/04 384/148 |
| 2015/0331105 A1* | 11/2015 | Bell | G01S 17/89 356/4.01 |
| 2016/0055744 A1* | 2/2016 | Branson | G08G 1/07 340/916 |
| 2016/0283963 A1* | 9/2016 | Zafiroglu | G06Q 30/02 |
| 2016/0320195 A1* | 11/2016 | Liu | G06Q 50/01 |
| 2016/0321566 A1* | 11/2016 | Liu | G06Q 10/02 |
| 2017/0178416 A1* | 6/2017 | Barreira Avegliano | G08G 1/017 |
| 2017/0284814 A1* | 10/2017 | Gaither | G01C 21/3415 |

FOREIGN PATENT DOCUMENTS

| | | | |
|---|---|---|---|
| JP | 2005-063190 A | | 3/2005 |
| JP | 2008-217729 A | | 9/2008 |
| JP | 2010-067061 A | | 3/2010 |
| JP | 2011137724 A | * | 7/2011 |
| JP | 5607353 B2 | * | 10/2014 |
| KR | 10-2012-0135611 A | | 12/2012 |
| KR | 10-2013-0040430 A | | 4/2013 |

* cited by examiner

| COUNTRY | USA | CANADA | EUROPE | S. KOREA |
|---|---|---|---|---|
| MINIMUM NUMBER OF OCCUPANTS REQUIRED TO USE CARPOOL LANE | 2 | 3 | TBD | 6 |
| GPS RANGE | XXX.XXX~ | XXX.XXX~ | XXX.XXX~ | XXX.XXX~ |
| OPERATING HOURS | 5 A.M. ~ 10 A.M. | TBD | TBD | 8 A.M. ~ 12 A.M. |
| OPERATING DAYS OF WEEK | MON TO FRI | TBD | TBD | SAT/SUN |

FIG. 4

THERE IS A CARPOOL LANE ON THE WAY TO THE SET DESTINATION AND CONDITIONS FOR USING THE CARPOOL LANE ARE SATISFIED.

DO YOU WANT TO AUTOMATICALLY SET WHETHER TO USE THE CARPOOL LANE?

YES    NO

DRIVING TIME TO DESTINATION WHEN USING CARPOOL LANE: 2 HOURS
DRIVING TIME TO DESTINATION WHEN USING GENERAL LANE: 3 HOURS

A VEHICLE HAS MOVED TO CANADA, THE NUMBER OF OCCUPANTS IS THREE, AND THE DAY IS ONE OF THE OPERATING DAYS OF WEEK. ACCORDINGLY, THE CARPOOL LANE CAN BE USED.

DO YOU WANT TO AUTOMATICALLY SET WHETHER TO USE THE CARPOOL LANE?

| YES | NO |

DRIVING TIME TO DESTINATION WHEN USING CARPOOL LANE: 2 HOURS

DRIVING TIME TO DESTINATION WHEN USING GENERAL LANE: 3 HOURS

AUTOMATIC CONTROL METHOD FOR CARPOOL LANE FOR NAVIGATION TERMINAL

CROSS-REFERENCE TO RELATED APPLICATION

The present application claims priority to Korean Patent Application No. 10-2017-0033703, filed in Korea on Mar. 17, 2017, the entire contents of which is incorporated herein for all purposes by this reference.

BACKGROUND OF THE INVENTION

Field of the Invention

The present invention relates to a vehicle, and more particularly, to a technique for automatically informing a driver of a change in usability of a carpool lane along with a change of regulations while the driver drives a vehicle through several regions or countries.

Description of Related Art

Carpool is the sharing of one car so that one or more persons having the same destination or direction travel in the car.

For expressways in the metropolitan areas of the US and Europe, a high-occupancy vehicle lane, which is called a carpool road or a carpool lane, is widely being operated. A carpool lane has the same concept as a bus-only lane in South Korea, and there are some sections allowing only a vehicle with two or more occupants and some sections allowing only a vehicle with three or more occupants, depending on the regions. When a carpool lane is used, a driver can drive faster than when other lanes are used, but should be fined for violation of regulations such as a usage time, the number of occupants, etc.

Regulations on an occupant/time/day-of-week required to use a carpool lane are different depending on regions or countries. Accordingly, when a vehicle moves between several regions or countries, a driver of the vehicle may be fined for violation of the different regulations without knowing regulation details accurately.

Meanwhile, when a carpool lane is used through a navigation terminal, a vehicle cannot self-recognize the number of occupants, and thus the occupants should manually operate (On) whether to enter a carpool lane so that the navigation terminal can guide the vehicle to the carpool lane.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an automatic control method for a carpool lane for a navigation terminal. The automatic control method may automatically determine the number of occupants of a vehicle to automatically perform carpool lane settings on the navigation terminal and receive a carpool lane guidance conforming to different regulations of a region (or country) to which the vehicle has moved.

According to various aspects of the present invention, there is provided an automatic control method for a carpool lane for a navigation terminal, the automatic control method including setting a destination for the navigation terminal; checking a carpool lane along a route corresponding to the set destination; determining conditions for using the carpool lane; displaying settings for a carpool mode option on the navigation terminal when a vehicle being driven is allowed to use the carpool lane; and guiding the vehicle to the carpool lane when the carpool mode option is set.

The automatic control method may further include checking a current GPS location of the vehicle after the setting of a destination for the navigation terminal.

The checking of a carpool lane may include determining conditions for using the carpool lane when the carpool lane is present and driving on a general lane when there is no carpool lane.

The determining of conditions for using the carpool lane may include checking the current number of occupants of the vehicle; determining a current day of week and a current time; and comparing a current status including the current number of occupants, the current day of week, and the current time with a database to determine whether the conditions for using the carpool lane are satisfied.

The checking of the number of occupants of the vehicle may be achieved by use of at least one of a seat belt sensor and an indoor camera.

The checking of the number of occupants of the vehicle may be achieved by scanning a Bluetooth device carried by an occupant through a Bluetooth module.

The database may include information regarding carpool lane regulations for each country or region and information regarding a location of the carpool lane on a map.

The determining of conditions for using the carpool lane may include displaying settings for a carpool mode option when the conditions for using the carpool lane are satisfied and driving on a general lane when the conditions for using the carpool lane are not satisfied.

The displaying of settings for a carpool mode option may include displaying the number of occupants, a destination, operating hours, and operating days of week together with the settings.

The displaying of settings for a carpool mode option may include displaying a driving time to destination when the carpool lane is used and a driving time to destination when the general lane is used together with the settings.

The displaying of settings for a carpool mode option may include displaying a command for automatically setting whether to use the carpool lane so that a user selects one of "yes" and "no."

The displaying of settings for a carpool mode option may include driving on the carpool lane when "yes" is selected and driving on the general lane when "no" is selected.

The automatic control method may further include monitoring GPS information in real time after the driving on the carpool lane.

The automatic control method may further include determining a change of a region or country where the vehicle is currently located after the monitoring of GPS information in real time.

The determining of a change of a region or country where the vehicle is currently is located may be performed in the vicinity of a point of the change in advance.

The determining of a change of a region or country where the vehicle is currently located may further include determining whether there is a carpool lane along a route when a region or country where the vehicle is currently located is changed.

The automatic control method may further include determining whether the conditions for using the carpool lane are satisfied when the carpool lane is present along the route and perform switching to drive on a general lane when there is no carpool lane along the route.

The automatic control method may further include displaying settings for a carpool mode option when the carpool lane is present and the conditions for using the carpool lane are satisfied and driving on the general lane when the conditions for using the carpool lane are not satisfied.

The displaying of settings for a carpool mode option may include displaying the number of occupants, a region or country, operating hours, and operating days of week together with the settings.

The displaying of settings for a carpool mode option may include displaying a driving time to destination when the carpool lane is used and a driving time to destination when the general lane is used together with the settings.

The displaying of settings for a carpool mode option may include displaying a command for automatically setting whether to use the carpool lane so that a user selects one of "yes" and "no."

The displaying of settings for a carpool mode option may include driving on the carpool lane when "yes" is selected and driving on the general lane when "no" is selected.

According to various aspects of the present invention, there is provided an automatic control method for a carpool lane for a navigation terminal, the automatic control method including monitoring GPS information in real time; determining a change of a region or country where a vehicle is currently located; checking whether there is a carpool lane along a route when the region or country where the vehicle is currently located is changed; determining conditions for using the carpool lane; displaying settings for a carpool mode option on the navigation terminal when the vehicle being driven is allowed to use the carpool lane; and guiding the vehicle to the carpool lane when the carpool mode option is set.

According to still another aspect of the present invention, there is provided an automatic control method for a carpool lane for a navigation terminal, the automatic control method including monitoring GPS information in real time; determining a change of a region or country where a vehicle is currently located; checking whether there is a carpool lane along a route when the region or country where the vehicle is currently located is changed; checking the current number of occupants of the vehicle; determining a current day of week and a current time; comparing a current status including the current number of occupants, the current day of week, and the current time with a database to determine whether conditions for using the carpool lane are satisfied; displaying settings for a carpool mode option on the navigation terminal when the vehicle being driven is allowed to use the carpool lane; and guiding the vehicle to the carpool lane when the carpool mode option is set.

According to yet another aspect of the present invention, there is provided an automatic control method for a carpool lane for a navigation terminal, the automatic control method including setting a destination for the navigation terminal; checking a carpool lane along a route corresponding to the set destination; checking the current number of occupants of a vehicle; determining a current day of week and a current time; comparing a current status including the current number of occupants, the current day of week, and the current time with a database to determine whether conditions for using the carpool lane are satisfied; displaying settings for a carpool mode option on the navigation terminal when the vehicle being driven is allowed to use the carpool lane; guiding the vehicle to the carpool lane when the carpool mode option is set; and monitoring GPS information in real time to determine a change of a region or country where the vehicle is currently located.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION OF EXEMPLARY EMBODIMENTS

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, embodiments will be apparent from the accompanying drawings and the following detailed description.

In the drawings, a size is exaggerated, omitted, or schematically shown for convenience in description and clarity. Also, the size of each element does not entirely reflect an actual size. Also, like reference numerals refer to like elements throughout.

Figure 1:
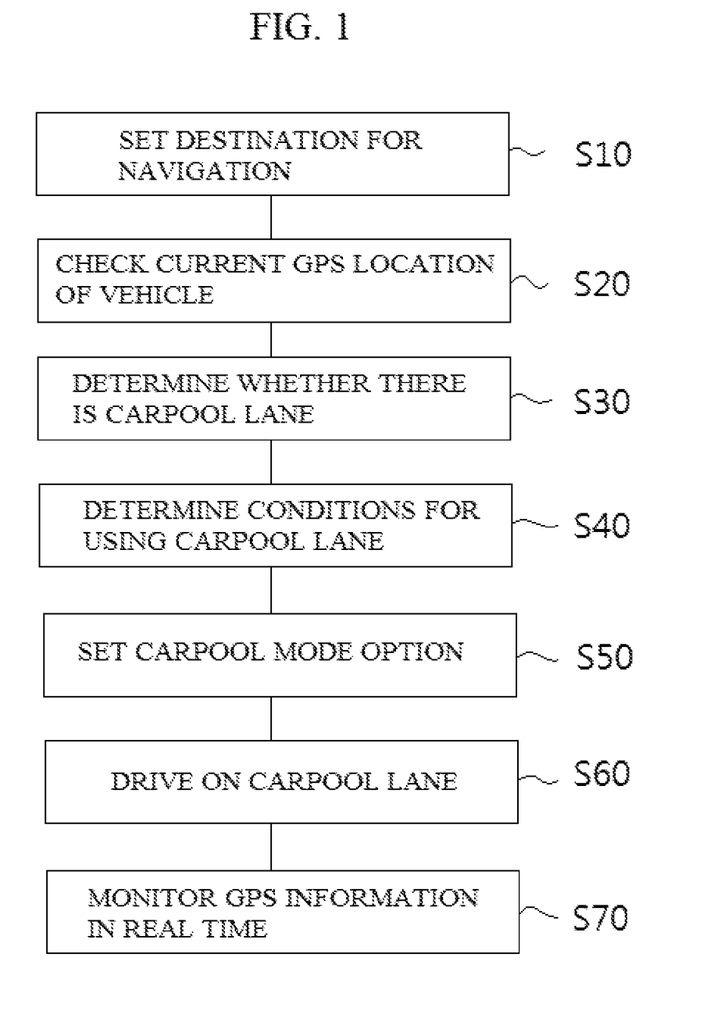
FIG. 1 is a flowchart showing an automatic control method for a carpool lane for a navigation terminal according to an exemplary embodiment of the present invention.
Figure 2:
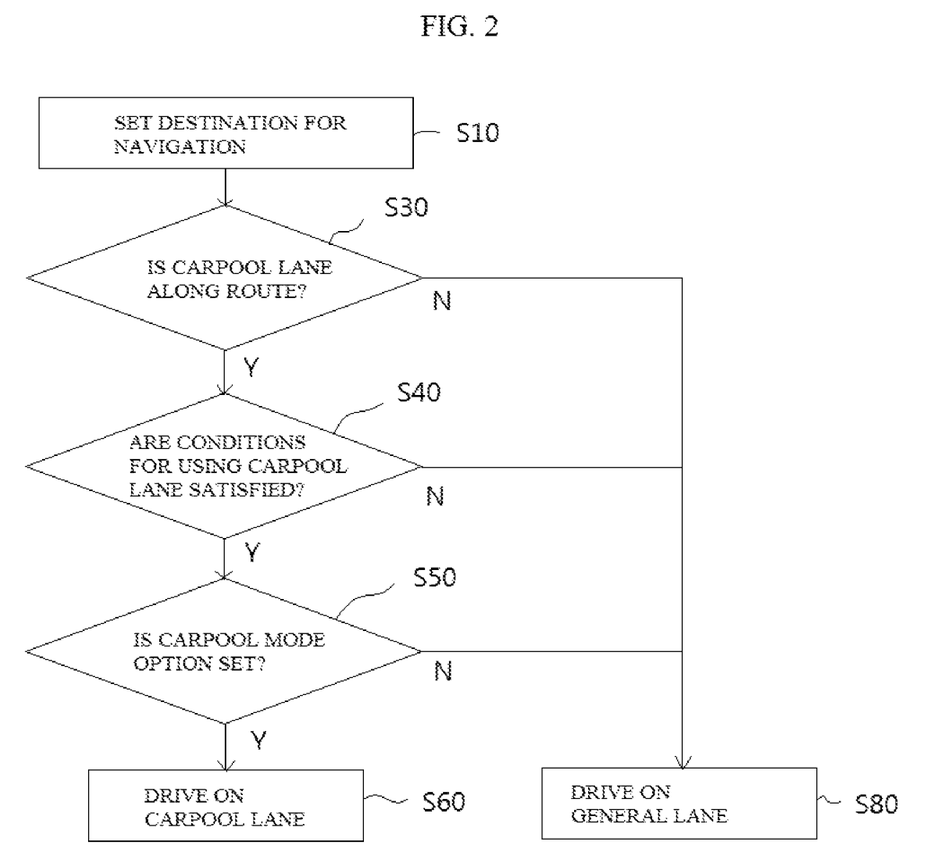
FIG. 2 shows the control method of FIG. 1 in detail.
Figure 3:
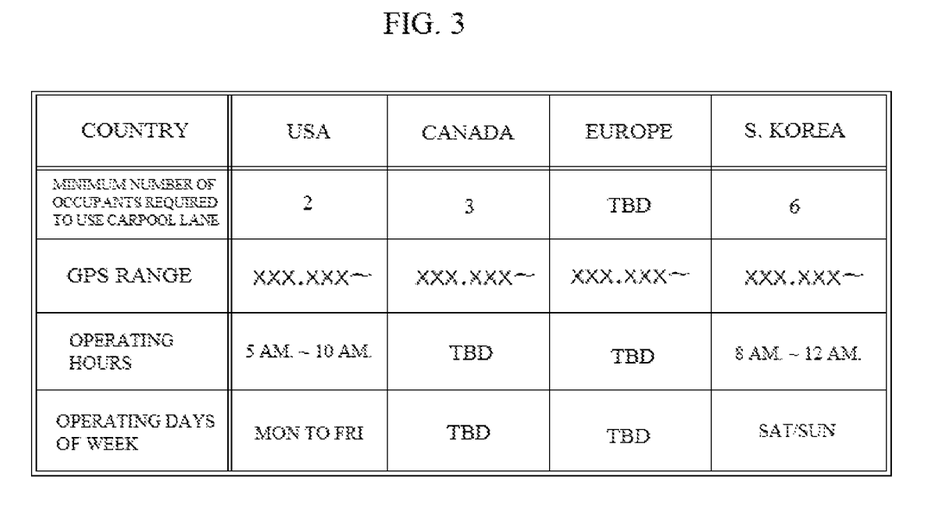
FIG. 3 is a table showing carpool lane regulations for each country stored in a database.
Figure 4:
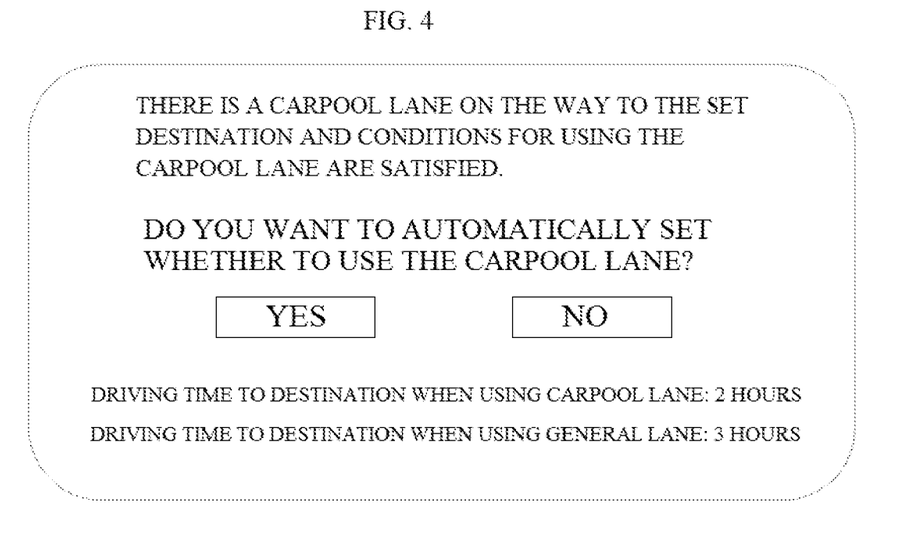
FIG. 4 shows an example of a screen for setting whether to use a carpool lane that is displayed on a navigation terminal.
Figure 5:
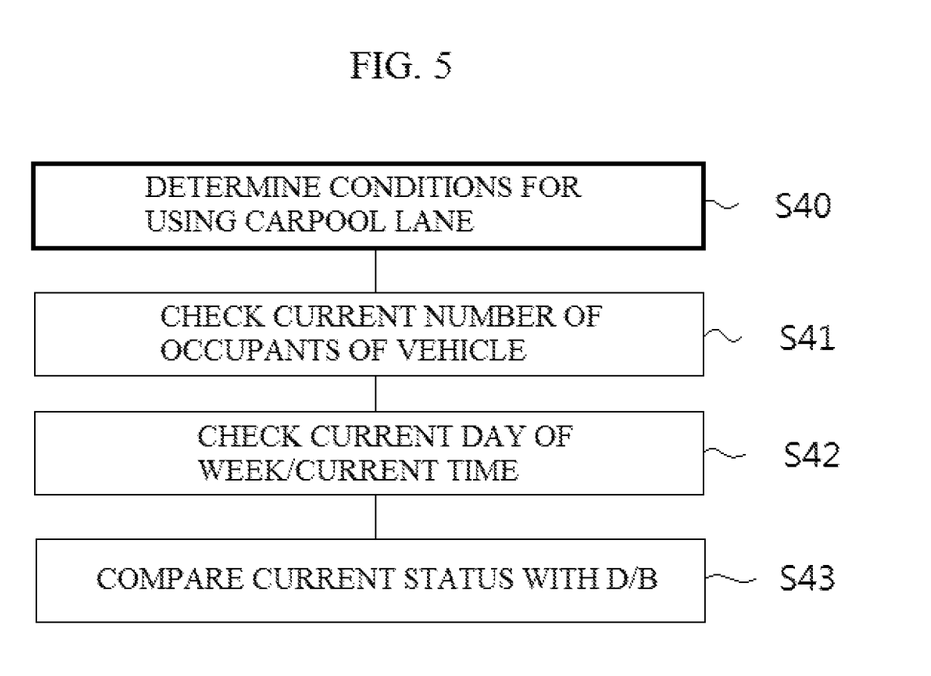
FIG. 5 is a flowchart showing a method of determining conditions for using a carpool lane.
Figure 6:
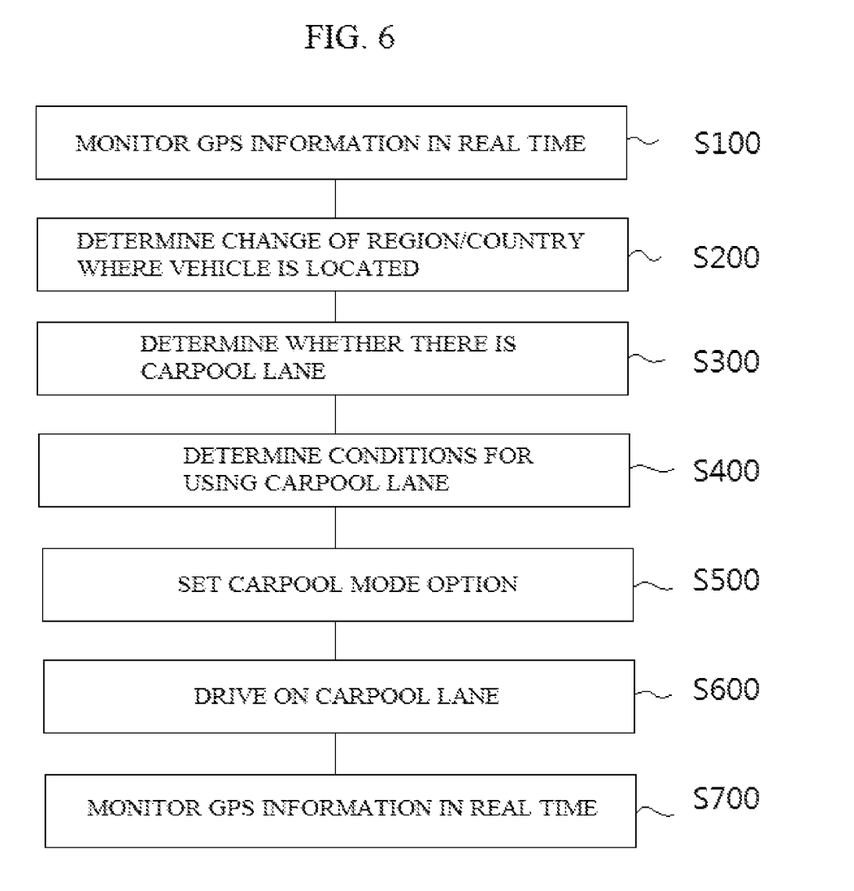
FIG. 6 is a flowchart showing an automatic control method for a carpool lane for a navigation terminal according to another exemplary embodiment of the present invention.
Figure 7:
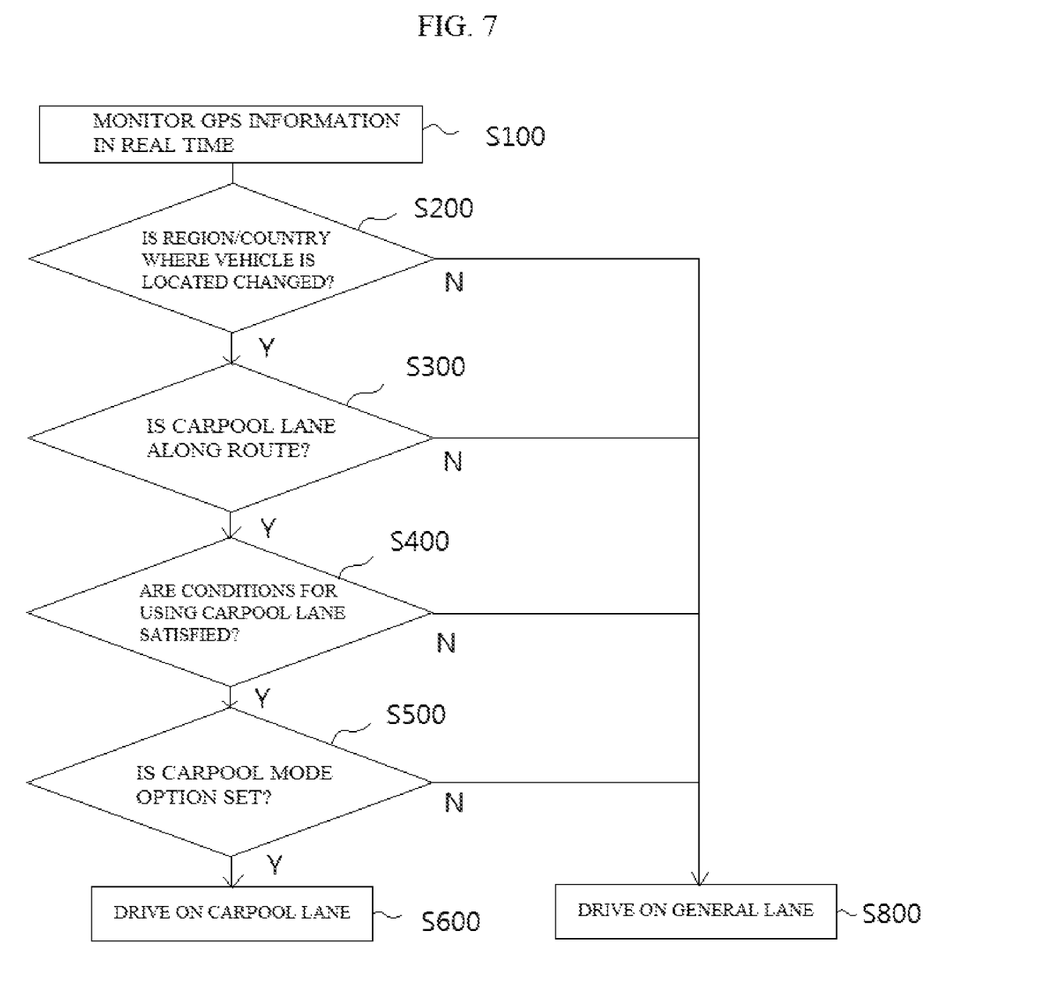
FIG. 7 shows the control method of FIG. 6 in detail.
Figure 8:
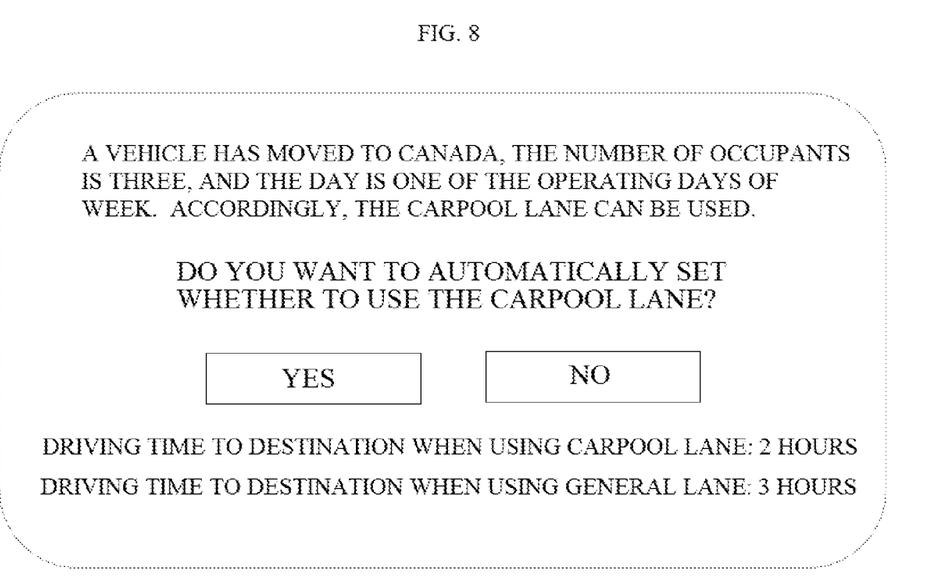
FIG. 8 shows another example of a screen for setting whether to use a carpool lane that is displayed on a navigation terminal.

FIG. 1 is a flowchart showing an automatic control method for a carpool lane for a navigation terminal according to an exemplary embodiment of the present invention, FIG. 2 shows the control method of FIG. 1 in detail, FIG. 3 is a table showing carpool lane regulations for each country stored in a database, FIG. 4 shows an example of a screen for setting whether to use a carpool lane that is displayed on a navigation terminal, FIG. 5 is a flowchart showing a method of determining conditions for using a carpool lane, FIG. 6 is a flowchart showing an automatic control method for a carpool lane for a navigation terminal according to another exemplary embodiment of the present invention, FIG. 7 shows the control method of FIG. 6 in detail, and FIG. 8 shows another example of a screen for setting whether to use a carpool lane that is displayed on a navigation terminal.

As shown in FIG. 1, an automatic control method for a carpool lane for a navigation terminal according to the present exemplary embodiment includes a step of setting a navigation destination (S10), a step of finding a current GPS location of a vehicle (S20), a step of checking a carpool lane (S30), a step of determining conditions for using the carpool lane (S40), a step of setting a carpool mode option (S50), a step of driving on the carpool lane (S60), and a step of monitoring GPS information in real time (S70).

In the step of setting a navigation destination (S10), a user inputs a desired destination to a navigation terminal. When the destination is input to the navigation terminal, the navigation terminal finds a current GPS location of a vehicle to find a driving route.

In the step of finding a current GPS location of a vehicle (S20), the navigation terminal may find current location information of a vehicle, find routes from the current location to the destination set in the step S10, and display the found routes, and a user may select any desired route from among the routes.

Next, the step of checking a carpool lane from a route corresponding to the set destination (S30) is performed. The carpool lane may be stored in a database of the navigation terminal (including a telematics server). The database may include information regarding carpool lane regulations for each country or region and information regarding a location of a carpool lane on a map and may update comprehensive information including carpool lane regulations, location information (map), etc. Through communication with a telematics server.

That is, regulations for using a carpool lane differ for each country, as shown in FIG. 3. For example, minimum numbers of occupants allowed to use a carpool lane in the United States, Canada, and South Korea are two, three, and six, respectively, and operating hours of a carpool lane also differ for each country.

The table of FIG. 3 is merely an example for description. A minimum number of occupants, operating hours, and operating days of week may differ depending on regions according to regulations of countries.

The above-described information regarding carpool lane regulations for each country or region, that is, the database (DB) may be stored in the navigation terminal. When the information stored in the navigation terminal is changed, the corresponding information may be automatically downloaded and updated in real time.

For example, a method of updating the above-described information regarding the carpool lane regulations may be updated through communication with a telematics center through a modem built in the navigation terminal.

When the carpool lane is found by the navigation terminal (S30), a step of determining conditions for using the carpool lane to check whether the vehicle can currently use the carpool lane (S40) is performed.

That is, as shown in FIG. 2, the conditions for using the carpool lane may be determined (S40) when there is a carpool lane along the route corresponding to the destination set in S10 (S30), and a step of driving on a general lane (S80) may be performed when there is no carpool lane.

As shown in FIG. 5, the step of determining conditions for using a carpool lane (S40) may include a step of checking the current number of occupants of the vehicle (S41), a step of determining a current day of week and a current time (S42), and a step of comparing a current situation including the number of occupants, a day of week, a time, etc., with the database (DB) to determine whether the conditions for using the carpool lane are satisfied (S43).

Here, the number of occupants of the vehicle may be performed in various methods.

As an example, at least one of a seat belt sensor for detecting whether each seat belt is fastened and an indoor camera may be used to check the number of occupants of the vehicle.

For example, the number of occupants may be found by checking whether seat belts of a driver seat, a passenger seat, and rear seats are fastened. Also, the number of occupants may be found by identifying occupants from an image captured through the indoor camera. It will be appreciated that the above-described number of occupants may be found by use of a seat belt sensor or an indoor camera and also by use of both of the seat belt sensor and the indoor camera to detect more accurate information.

The information detected as described above may be transmitted to the navigation terminal over a vehicle network (e.g., CAN communication). Accordingly, the navigation terminal may check information regarding the number of occupants of the vehicle.

As another example, a Bluetooth (BT) module may be included to find the number of occupants. The BT module may interoperate with the navigation terminal to scan a BT device (e.g., a smartphone, a smart watch, etc.) belonging to an occupant and find the occupant.

In addition, information regarding the number of occupants of the vehicle may be previously input to the navigation terminal by a user and may be obtained by various detecting device other than the above-described sensor.

When the vehicle can use the carpool lane as described above, the step of displaying settings for a carpool mode option on the navigation terminal (S50) may be performed.

That is, when the conditions for using the carpool lane are satisfied in the step of determining conditions for using the carpool lane (S40) as shown in FIG. 2, the step of displaying settings for a carpool mode option (S50) is performed. When the conditions for using the carpool lane are not satisfied in the step S40, the step of driving on a general lane (S80) may be performed.

In the step of displaying settings for a carpool mode option (S50), the number of occupants, a destination (route), operating hours, and operating days of week may also be displayed. As described above, information can be acquired in the step of determining conditions for using the carpool lane (S40) including the number of occupants, operating hours, and operating days of week, and information regarding the destination (route) can be acquired through the navigation destination setting (S10).

Also, in the step of displaying settings for a carpool mode option (S50), a driving time to destination when the carpool lane is used and a driving time to destination when the general lane is used may also be displayed. This is because the carpool lane and the general lane may be exchangeably busy or idle depending on road conditions and thus a user needs to be informed of traffic conditions without being unconditionally guided to the carpool lane.

Accordingly, in the step of displaying settings for a carpool mode option (S50), a command for automatically setting whether to use the carpool lane may be displayed so that a user can select one of "yes" and "no."

For example, as shown in FIG. 4, in the step of setting a navigation destination (S10) or when there is a carpool lane during driving and conditions for using the carpool lane including the number of occupants and an available time, are satisfied, the carpool lane selection mode may be displayed to a driver as described above.

In the above-described step of displaying settings for a carpool mode option (S50), a navigation screen may be displayed and also voice guidance may be provided.

Accordingly, the driver may select whether to drive on a carpool lane or a general lane through a touch or voice recognition operation, and the navigation terminal may perform guidance along the selected lane.

That is, as shown in FIG. 2, the step of driving on the carpool lane (S60) is performed when "yes" is selected in the step of displaying settings for a carpool mode option (S50), and the step of driving on the general lane (S80) is performed when "no" is selected.

As described above, when there is a carpool lane, conditions for using the carpool lane are satisfied, and also a user sets "yes" for the carpool mode option, the navigation terminal guides the vehicle to the carpool lane.

After the step of driving on the carpool lane (S60), the step of monitoring GPS information in real time is performed. The step S60 may be continuously performed since the step of finding the current GPS location of the vehicle (S20). Thus, it is possible to take an immediate action when a vehicle is moving or is scheduled to move between regions or countries having different regulations by finding current GPS location information of the vehicle in real time.

Accordingly, as shown in FIG. 6, after the step of monitoring GPS information in real time (S100), a step of determining a change of a region or country where the vehicle is currently located (S200) may be performed.

The determination of a change of a region or country where the vehicle is currently located may be performed in the vicinity of a location of the change in advance. That is, a driver may take an action while a vehicle is moving along a driving route by performing the determination in advance when the vehicle is expected to pass through a region (or country) having different carpool lane regulations.

When the region or country where the vehicle is currently located is changed in the step of determining a change of a region or country where the vehicle is currently located (S200), a step of determining whether there is a carpool lane along the route (S300) may be performed. When there is no carpool lane along the route in the step S300, switching is performed to drive on a general lane (S800).

As shown in FIG. 7, when it is determined that the region or country where the vehicle is currently located is changed (S200) and there is a carpool lane along the route (S300), whether condition for using the carpool lane are satisfied may be determined again (S400). This is because the conditions for using the carpool lane differ depending on the region or country.

For example, when a vehicle is moving from the United States to Canada, a control device may always monitor GPS data of a Canada region stored in a navigation terminal. Here, when the Canada region is entered, the controller may primarily determine regulation information for driving on a carpool lane and automatically perform carpool setting (On) on the navigation terminal or release (Off) the carpool setting when corresponding conditions are satisfied.

The control device may extract information regarding the number of carpool occupants for each country from a database (DB), and the navigation terminal may automatically set or release a carpool mode through the number of occupants of the vehicle that is found by the previous step (S400). When the number of occupants of the vehicle is changed, the control device may immediately change setting values to initialize navigation guidance and then may perform a search again.

When there is a carpool lane (S300) and conditions for using the carpool lane are satisfied (S400), the navigation terminal may display settings for a carpool mode option (S500). When the conditions for using the carpool lane are not satisfied, the driver may drive on a general lane (S800).

Here, in the step of displaying settings for a carpool mode option (S500), the control device may also display the number of occupants, a region or country, operating hours, and operating days of week or display a driving time to destination when the carpool lane is used and a driving time to destination when the general lane is used.

For example, as shown in FIG. 8, when a vehicle is moving from the United States to Canada, the number of occupants is three, and the day is one of the operating days of week, the carpool lane can be used. In the instant case, the control device may predict a driving time to destination when the carpool lane is used and a driving time to destination when the general lane is used and display a carpool lane selection mode on a navigation window along with a guidance comment.

For a driving time under conditions for using the carpool lane and conditions for using the general lane, the control device may monitor information for each country or road on the basis of database information built in a GPS and the navigation terminal and may request and receive carpool lane/general lane driving time information from a center and show the information to a user when the vehicle enters a corresponding country.

In the step of displaying settings for a carpool mode option (S500), the control device may display a command for automatically setting whether to use the carpool lane so that the user can select one of "yes" and "no." The step of driving on the carpool lane (S600) may be performed when "yes" is selected, and the step of driving on the general lane (S800) may be performed when "no" is selected.

According to an automatic control method for a carpool lane for a navigation terminal of the present invention, it is possible to automatically determine the number of occupants of a vehicle to automatically perform carpool lane settings on the navigation terminal and receive a carpool lane guidance conforming to different regulations of a region (or country) to which the vehicle has moved.

The features, structures, and effects described in the above embodiments are incorporated into at least one exemplary embodiment of the present invention, but are not limited to only one embodiment. Moreover, features, structures, and effects exemplified in one exemplary embodiment can easily be combined and modified for another exemplary embodiment and then be carried out by those skilled in the art. Therefore, these combinations and modifications should be construed as falling within the scope of the present invention.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automatic control method for a carpool lane for a navigation terminal, the automatic control method comprising:
    setting a destination for the navigation terminal;
    checking a current GPS location of a vehicle after the setting of the destination for the navigation terminal;
    checking the carpool lane along a route corresponding to the set destination;
    checking a current number of occupants of the vehicle;
    determining a current day of a week and a current time;
    comparing a current status including the current number of occupants, the current day of the week, and the current time with a database to determine whether conditions for using the carpool lane are satisfied;
    automatically displaying settings for a carpool mode option on the navigation terminal when the vehicle being driven is allowed to use the carpool lane; and
    guiding the vehicle to the carpool lane when the carpool mode option is set,
    wherein the checking of the carpool lane includes determining the conditions for using the carpool lane when the carpool lane is present and driving the vehicle on a general lane not including the carpool lane when there is no carpool lane,
    wherein information of the carpool lane is stored in a database of the navigation terminal, and updated in the database via communication with a telematics server,
    wherein the checking the current number of the occupants of the vehicle is achieved by using a seat belt sensor to detect whether a seat belt is fastened to each seat or by using person information input to the navigation terminal, and
    wherein the displaying of the settings for the carpool mode option includes displaying a driving time to the destination corresponding to use of the carpool lane and a driving time to the destination corresponding to use of the general lane simultaneously, whereby traffic conditions of the carpool lane and the general lane are informed when the carpool lane and the general lane are exchangeably busy or idle depending on road conditions.

2. The automatic control method of claim 1, wherein the checking of the current number of the occupants of the vehicle is achieved by use of indoor camera.

3. The automatic control method of claim 2, wherein the checking of the current number of the occupants of the vehicle is achieved by scanning a Bluetooth device carried by an occupant through a Bluetooth module.

4. The automatic control method of claim 3, wherein the database includes information regarding carpool lane regulations for each country or region and information regarding a location of the carpool lane on a map.

5. The automatic control method of claim 2, wherein the determining of the conditions for using the carpool lane includes displaying settings for the carpool mode option when the conditions for using the carpool lane are satisfied and driving on the general lane when the conditions for using the carpool lane are not satisfied.

6. The automatic control method of claim 5, wherein the displaying of the settings for the carpool mode option includes displaying the current number of the occupants, the destination, operating hours, and operating days of week together with the settings.

7. The automatic control method of claim 6, wherein the displaying of the settings for the carpool mode option includes displaying a driving time to the destination when the carpool lane is used and a driving time to the destination when the general lane is used together with the settings.

8. The automatic control method of claim 1, wherein the displaying of the settings for the carpool mode option includes displaying a command for automatically setting whether to use the carpool lane wherein a user selects one of "yes" and "no."

9. The automatic control method of claim 8, wherein the displaying of the settings for the carpool mode option includes driving on the carpool lane when "yes" is selected and driving on the general lane when "no" is selected.

10. The automatic control method of claim 1, wherein the determining of a change of a region or a country where the vehicle is currently located is performed in a vicinity of a location of the change in advance.

11. The automatic control method of claim 10, wherein the determining of the change of the region or the country where the vehicle is currently located further includes determining whether there is a carpool lane along a route when the region or the country where the vehicle is currently located is changed.

12. The automatic control method of claim 11, further including determining whether the conditions for using the carpool lane are satisfied when the carpool lane is present along the route and performing switching to drive on the general lane when there is no carpool lane along the route.

13. The automatic control method of claim 12, further including displaying settings for the carpool mode option when the carpool lane is present and the conditions for using the carpool lane are satisfied and driving on the general lane when the conditions for using the carpool lane are not satisfied.

14. The automatic control method of claim 13, wherein the displaying of settings for the carpool mode option includes displaying the number of the occupants, a region or country, operating hours, and operating days of week together with the settings.

15. The automatic control method of claim 14, wherein the displaying of the settings for the carpool mode option includes displaying a driving time to the destination when the carpool lane is used and a driving time to the destination when the general lane is used together with the settings.

16. The automatic control method of claim 15, wherein the displaying of the settings for the carpool mode option includes displaying a command for automatically setting whether to use the carpool lane wherein a user selects one of "yes" and "no."

17. The automatic control method of claim 16, wherein the displaying of the settings for the carpool mode option includes driving on the carpool lane when "yes" is selected and driving on the general lane when "no" is selected.

18. An automatic control method for a carpool lane for a navigation terminal, the automatic control method including:
    monitoring GPS information in a real time;
    determining a change of a region or country where a vehicle is currently located;
    checking whether there is the carpool lane along a route when the region or country where the vehicle is currently located is changed;
    checking a current number of occupants of the vehicle;
    determining a current day of week and a current time;
    comparing a current status including the current number of occupants, the current day of week, and the current time with a database to determine whether conditions for using the carpool lane are satisfied;
    displaying settings for a carpool mode option on the navigation terminal when the vehicle being driven is allowed to use the carpool lane; and
    guiding the vehicle to the carpool lane when the carpool mode option is set,
    wherein the checking of the carpool lane includes determining the conditions for using the carpool lane when the carpool lane is present and driving the vehicle on a general lane not including the carpool lane when there is no carpool lane,
    wherein information of the carpool lane is stored in a database of the navigation terminal, and updated in the database via communication with a telematics server,
    wherein the checking the current number of the occupants of the vehicle is achieved by using a seat belt sensor to detect whether a seat belt is fastened to each seat or by using person information input to the navigation terminal, and
    wherein the displaying of the settings for the carpool mode option includes displaying a driving time to the destination corresponding to use of the carpool lane and a driving time to the destination corresponding to use of the general lane simultaneously, whereby traffic conditions of the carpool lane and the general lane are informed when the carpool lane and the general lane are exchangeably busy or idle depending on road conditions.

* * * * *